United States Patent

Oshiro

[11] Patent Number: 5,900,543
[45] Date of Patent: May 4, 1999

[54] METHOD FOR DETECTING DECREASE OF TIRE AIR PRESSURE AND APPARATUS USED THEREFOR

[75] Inventor: Yuji Oshiro, Akashi, Japan

[73] Assignees: Sumitomo Rubber Industries, Ltd, Hyogo-ken; Sumitomo Electric Industries, Ltd., Osaka-fu, both of Japan

[21] Appl. No.: 08/838,736

[22] Filed: Apr. 10, 1997

[30] Foreign Application Priority Data

Apr. 15, 1996 [JP] Japan .................................. 8-092311

[51] Int. Cl.$^6$ .................................................. B06C 23/06
[52] U.S. Cl. .......................................... 73/146.2; 340/444
[58] Field of Search ........................... 73/146.2; 340/444, 340/943

[56] References Cited

U.S. PATENT DOCUMENTS

| | | | |
|---|---|---|---|
| 5,192,929 | 3/1993 | Walker et al. | 340/444 |
| 5,248,957 | 9/1993 | Walker et al. | 73/146.2 X |
| 5,343,741 | 9/1994 | Nishihara et al. | 73/146.2 |
| 5,442,331 | 8/1995 | Kishimoto et al. | 73/146.2 X |
| 5,578,984 | 11/1996 | Nakajima | 73/146.2 X |
| 5,629,478 | 5/1997 | Nakajima et al. | 73/146.2 |

FOREIGN PATENT DOCUMENTS

| | | |
|---|---|---|
| 0652121 | 5/1995 | European Pat. Off. . |
| 0656268 | 6/1995 | European Pat. Off. . |
| 63-305011 | 12/1988 | Japan . |
| 4212609 | 8/1992 | Japan . |

*Primary Examiner*—Michael Brock
*Attorney, Agent, or Firm*—Birch, Stewart, Kolasch & Birch, LLP

[57] ABSTRACT

A method for detecting decrease of tire air pressure includes detecting each angular velocity of rotation of four tires, judging as to whether the tire air pressure is decreased or not based on the detected angular velocity of rotation, and issuing an alarm. The method includes a judgement step for low velocity in which, when the angular velocity of rotation is detected, judgment is made as to whether the tire air pressure is decreased or not; and a judgement step for high velocity in which, when the angular velocity of rotation is detected, judgment is made as to whether the tire air pressure is decreased or not only when the vehicle velocity is higher than a predetermined threshold value and the vehicle is in driven condition.

10 Claims, 12 Drawing Sheets

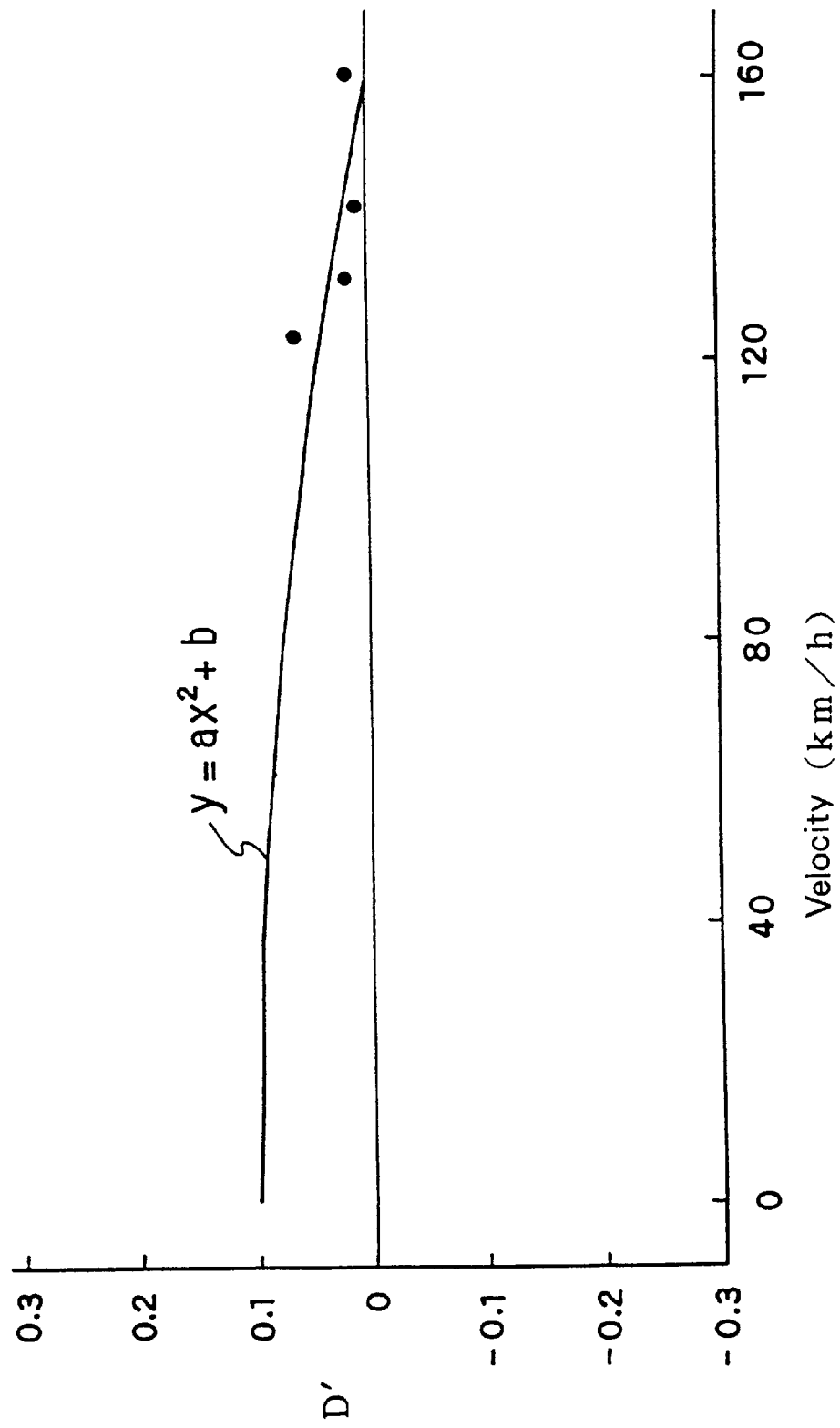
F I G. 1 2

METHOD FOR DETECTING DECREASE OF TIRE AIR PRESSURE AND APPARATUS USED THEREFOR

BACKGROUND OF THE INVENTION

The present invention relates to a method for detecting decrease of tire air pressure and an apparatus used therefor. More particularly, the invention relates to a method for detecting decrease of tire air pressure regardless of whether a vehicle is running at a low velocity or at a high velocity and an apparatus used therefor.

In recent years, as one of the safety devices for the 4-wheel vehicles such as passenger cars and trucks, there have been proposed devices for detecting decrease of tire air pressure, some of which have already been in practical application.

The devices for detecting decrease of tire air pressure are those developed under recognition of the importance thereof mainly for the following reasons. Namely, when the air pressure decreases, the temperature of the tire increases due to increase of deflection. When the temperature increases, the strength of polymer materials used for the tire decreases, leading to bursting of the tire. Normally, it frequently occurs for the driver not becoming aware of the loss of air in the tire by about 0.5 atm. For this reason, an apparatus capable of detecting such loss of air pressure has been desired.

The method of detecting decrease of air pressure in the above-mentioned tire air pressure detecting device includes, for example, one based on the difference of the angular velocity of rotation F1, F2, F3 and F4 (hereinafter, when generally called, referred to angular velocity of rotation Fi) of four tires W1, W2, W3 and W4 provided on the vehicle (tires W1 and W2 correspond to the front left and right tires, and tires W3 and W4 correspond to the rear left and right tires, respectively; hereinafter, when generally called, referred to tire Wi).

According to the method, for example, based on signals outputted from the wheel velocity sensor fitted to the tire Wi, the angular velocity of rotation Fi of the tire Wi is detected on each predetermined sampling period. Here, the detected angular velocity of rotation Fi is all the same, provided that the effective rolling radii of tire Wi (amount obtained by dividing the distance of vehicle advance by $2\pi$ when the tire rotates by one turn during free rotation of tire) are all the same, and the vehicle runs linearly.

On the other hand, the effective rolling radii of tire Wi often vary due to the variation of air pressure of the tire Wi. Namely, when the air pressure of the tire Wi decreases, the effective rolling radius becomes smaller than in the case of normal inner pressure. Accordingly, the angular velocity of rotation Fi of the tire Wi in which its air pressure is lowered becomes faster than in the case of normal inner pressure. Therefore, the decrease of air pressure of the tire Wi can be detected by the difference of each angular velocity of rotation Fi.

The judgement equation for detecting decrease of air pressure of the tire Wi by the difference of angular velocity of rotation Fi is, for example, one as shown in the following equation (1) (refer to, for example, Japanese Unexamined Patent Publications No. 305011/1988 and No. 212609/1992).

$$(F_1+F_4-F_2-F_3)/\{(F_1+F_2+F_4)/2\} \quad (1)$$

Assuming that the effective rolling radii of the above tires Wi are all the same, the angular velocity of rotation Fi becomes all the same ($F_1=F_2=F_3=F_4$), so that the judgement value D is 0. Therefore, when the threshold value $D_{TH1}$ and $D_{TH2}$ are set and the following equation (2) is satisfied, it is judged that there is a tire Wi in which the air pressure is lowered, and when the equation (2) is not satisfied, it is judged that there is no tire Wi whose air pressure is lowered. Further, when it is judged that there is a tire Wi whose air pressure is lowered, an alarm is issued by, for example, a display device.

$$D<-D_{TH1} \text{ or } D>D_{TH2} \quad (2)$$

However, with only the judgement of the air pressure decrease based on the above equations (1) and (2), there is a drawback of possibility of erroneous detection, depending on the vehicle running condition. For example, when the air pressure of any one tire Wi of the tires Wi shows decrease in air pressure, accurate detection can be made whether the air pressure is lowered or not if the vehicle is running at a relatively low velocity, while if the vehicle is running at a relatively high velocity with being driven, there is a possibility of erroneous detection to be made. The reason is because the slip rate of the depressurized wheel during the high velocity running is lowered, and the rolling radius increases by the centrifugal force of the tire.

In view of the above circumstances described above, an object of the present invention is to provide a method for detecting decrease of tire air pressure and an apparatus used therefor capable of detecting accurately decrease of tire air pressure regardless of the vehicle running condition, thereby preventing erroneous issuance or non-issuance of alarm (that is, notwithstanding the pressure decrease, no alarm is activated).

A further object of the present invention is to provide a method for detecting decrease of tire air pressure and an apparatus used therefor capable of detecting accurately decrease of tire air pressure regardless of the vehicle running condition, especially regardless of the vehicle running velocity, thereby preventing erroneous issuance or non-issuance of alarm.

SUMMARY OF THE INVENTION

In accordance with the present invention, there is provided a method for detecting decrease of tire air pressure comprising: detecting each angular velocity of rotation of four tires provided on a vehicle, judging as to whether the tire air pressure is decreased or not based on the detected angular velocity of rotation, and activating an alarm when it is judged that the air pressure is lowered. The method includes: a judgement step for low velocity in which, when the angular velocity of rotation is detected, judgement is made as to whether the tire air pressure is decreased or not based on the detected angular velocity of rotation; and a judgement step for high velocity in which, when the angular velocity of rotation is detected. Judgement is then made as to whether the tire air pressure is decreased or not based on the detected angular velocity of rotation only when the vehicle velocity is higher than a predetermined threshold value and the vehicle is in a driven condition.

Also, the judgement step for high velocity might be one wherein the vehicle velocities higher than a predetermined threshold value are divided into regions at certain intervals. When a predetermined number of data values have been accumulated in a predetermined number of velocity ranges out of all the velocity ranges, the data coming within the velocity range satisfying the data number condition are averaged. A secondary function is then obtained by the least squares method from the averaged data to obtain the judgement value at medium and low velocities from the secondary function, so that the alarm can be detected based on the judgement value.

Further, in the judgement step for high velocity, when the difference between the maximum value and the minimum value of the averaged data is less than the predetermined threshold value, the averaged data in all regions can be set to zero.

With respect to the judgement step for high velocity, if there is a possiblity to cause erroneous judgement on operation in view of the region to be used for the least squares method or relation of the averaged data, then correction of data can be made.

Also, in the judgement step for high velocity, if the high velocity region and the region to be used for the least squares method is near, the averaged data can be set to zero.

Further, in the judgement step for high velocity, the threshold value of the alarm judgement might bd changed depending on the region of the lower limit velocity of the averaged data to be used for the least squares method.

Further, in the judgement step for high velocity, the averaged data of the lower limit velocity to be used for the least squares method might be weighted.

Further, in accordance with the present invention, there is provided a method for detecting decrease of tire air pressure comprising: detecting each angular velocity of rotation of four tires provided on a vehicle, judging as to whether the tire air pressure is decreased or not based on the detected angular velocity of rotation, and issuing alarm when it is judged that the air pressure is lowered.

The method includes the steps of: judging, during a low velocity, as to whether a judgement value obtained by correcting the detected angular velocity of rotation by information of the Vehicle satisfies a predetermined threshold value or not. During a high velocity and yet during a driven condition, a judgement value is obtained for low velocity from a relationship between the velocity from the optional velocity and the judgement value, thereby judging whether the judgement value satisfies a predetermined threshold value or not.

In accordance with the present invention, there is further provided an apparatus for detecting decrease of tire air pressure in which each angular, velocity of rotation of four tires provided on a vehicle is detected. Judegment is then made as to whether the tire air pressure is decreased or not based on the detected angular velocity of rotation, and when it is judged that the air pressure is lowered, an alarm is activated. The apparatus comprises velocity detecting means for detecting the vehicle velocity, means for identifying whether the vehicle velocity detected by the velocity detecting means is higher than a predetermined threshold value or not, and drive condition detecting means for detecting whether the vehicle is in driven condition or not. The judging means comprises judging means for low velocity which, when each angular velocity of rotation is detected by the velocity detecting means, judges as to whether the tire air pressure is decreased or not based on the detected angular velocity of rotation; and judging means for high velocity which, when each angular velocity of rotation is detected, judges as to whether the tire air pressure is decreased or not based on the detected angular velocity of rotation only when the vehicle velocity detected by the velocity detecting means is judged to be higher than the predetermined threshold value in the identifying means and when the vehicle is judged to be in driven condition in the drive condition detecting means.

Furthermore, there is provided an apparatus for detecting decrease of tire air pressure in which each angular velocity of rotation of four tires provided on a vehicle is detected. Judgement is then made as to whether the tire air pressure is decreased or not based on the detected angular velocity of rotation, and when it is judged that the air pressure is lowered, an alarm is activated or issued. The apparatus comprises judging means for low velocity for judging, during a low velocity, as to whether a judgement value obtained by correcting the detected angular velocity of rotation by information of the vehicle satisfies a predetermined threshold value or not; and judging means for high velocity for judging, during a high velocity and yet during a driven condition, obtaining a judgement value in low velocity from relation between the velocity from the optional velocity and the judgement value, thereby judging whether the judgement value satisfies a predetermined threshold value or not.

Also, the judging means for high velocity might be one wherein the vehicle velocities higher than a predetermined threshold value are divided into regions at certain intervals, and then, at the time when a predetermined number of data values have been accumulated in a predetermined number of velocity ranges out of all the velocity ranges, the data coming within the velocity range satisfying the data number condition are averaged. A secondary function is then obtained by the least squares method from the averaged data to obtain the judgement value at medium and low velocities from the secondary function, so that the alarm can be activated based on the judgement value.

Further, the judging means for high velocity, when the difference between the maximum value and the minimum value of the averaged data is less than the predetermined threshold value, can set the averaged data in all regions to zero.

The judging means for high velocity, if there is a possibilty to cause erroneous judgement on operation in view of the region to be used for the least squares method or relation of the averaged data, can correct the data.

Also, the judging means for high velocity, if the high velocity region and the region to be used for the least squares method are near, can set the averaged data to zero.

Further, the judging means for high velocity can change the threshold value of the alarm judgement depending on the region of the lower limit velocity of the averaged data to be used for the least squares method.

Further, the judging means for high velocity can weigh the averaged data of the lower limit velocity to be used for the least squares method.

For the present invention, there are provided a plurality of judging means suited respectively to the vehicle running conditions. Accordingly, the judgement according to the vehicle running condition can be ascertained by any one of the judging means.

Accordingly, if it is judged that the tire air ressure is decreased in at least one judging means of the plural judging means, it can be judged that the tire air pressure is certainly lowered. In other words, in case that the tires are all judged to be in normal inner pressures by all judging means, the tires can be reliably judged to be in normal inner pressures.

Further, in the present invention, with special notice of the point at what velocity the vehicle is running out of the vehicle running conditions, there are provided two judging means: one for low velocity and the other for high velocity.

For example, when the air pressure of any tire has decreased, on a vehicle running at high velocity, there might occur cases where the difference in angular velocity of rotation becomes almost zero between the case where the air pressure is lowered and the case of normal inner pressure. For this reason, according to the judging means to carry out judgement on detection of the angular velocity of rotation, there is a likelihood for erroneous detection to occur. On the other hand, even if a vehicle runs at a high velocity when the air pressure of any tire is lowered and when the vehicle is in a driven state, according to the increase of velocity from a certain level, the difference in angular velocity of rotation between the case where the air pressure is lowered and the case of normal inner pressure decreases in a secondary function manner can be ascertained. A method of the present invention obtains a difference in angular velocity of rotation between the case where the air pressure is lowered and the case of normal inner pressure at a low velocity from the secondary function.

Accordingly, in the present invention, in addition to the judging means for low velocity to carry out judgement on detection of the angular velocity of rotation, there is provided judging means for high velocity to carry out judgement when conditions are satisfied such that, after detection of the angular velocity of rotation, the vehicle velocity is more than the threshold value and yet the vehicle is in a driven state. Therefore, regardless of the running velocity level of the vehicle, accurate detection can be made as to whether the air pressure of the tire has decreased or not. Thus, erroneous issuance or non-issuance of alarm can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIG. 12 is a view for illustrating the least squares method relating to another embodiment.

DETAILED DESCRIPTION

Hereinafter, the method for detecting decrease of tire air pressure and an apparatus used therefor of the present invention are explained with reference to the accompanying drawings.

Figure 1:
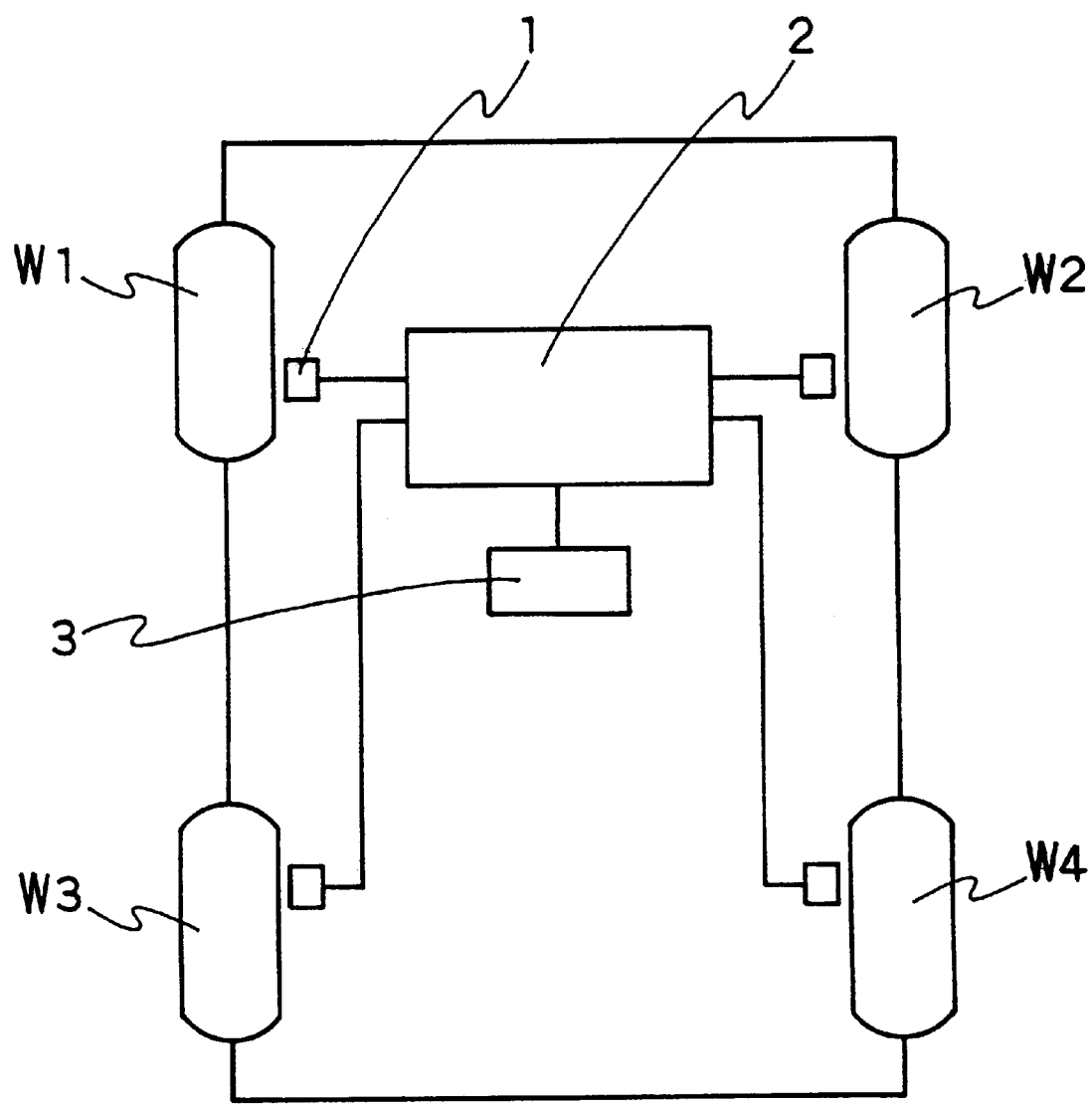
FIG. 1 is a block diagram to show an embodiment of an apparatus for detecting decrease of tire air pressure according to the present invention.
Figure 2:
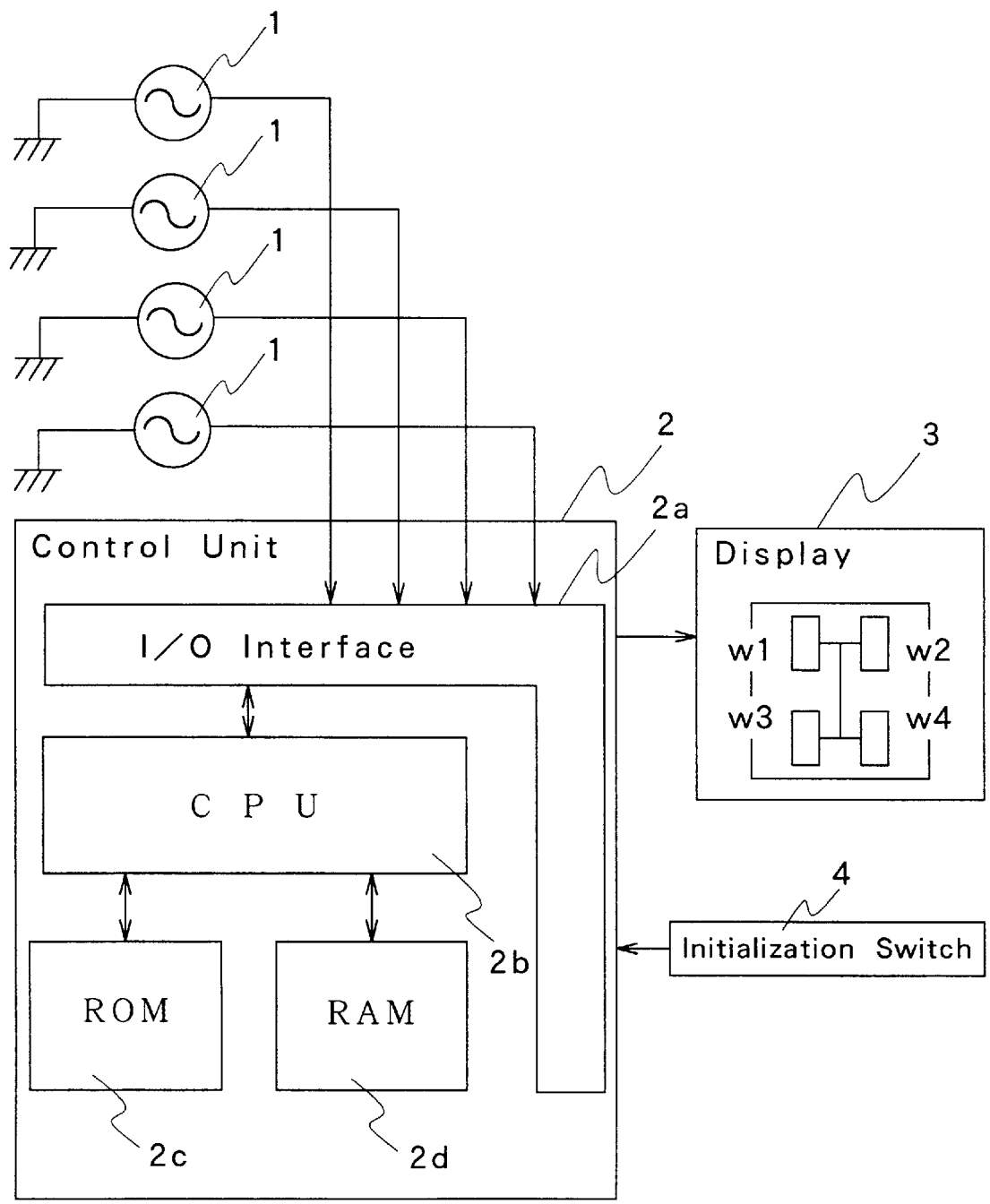
FIG. 2 is a block diagram to show an electrical structure of the apparatus for detecting decrease of tire air pressure in FIG. 1.

As shown in FIGS. 1 to 2, the apparatus for detecting decrease of tire air pressure of the present invention detects whether the air pressures of the four tires W1, W2, W3 and W4 provided on a four-wheel vehicle have decreased or not, and is furnished with ordinary wheel velocity sensors 1 provided in connection with the tires W1, W2, W3 and W4, respectively. The output of the wheel velocity sensor 1 is given to the control unit 2. To the control unit 2 there is connected a display 3 which is constituted by a liquid crystal display device, a plasma display device or CRT for notifying the tire Wi whose air pressure has decreased. Also, since the tire Wi is manufactured with dispersion within the standard, it is necessary to make correction so as to make the dynamic load radii of Wi identical within the normal inner pressure. For this purpose, the part 4 is a switch to provide an initial step for the above correction.

The control unit 2 includes, as shown in FIG. 2, an I/O interface 2a which is necessary for receipt and delivery of signals with the external apparatuses, CPU 2b which functions as a nucleus of operation processing, ROM 2c storing control operation programs for the CPU 2b, and RAM 2d in which the data are temporarily written or from which the written data are read out for the purpose of the control operation of the CPU 2b.

In the above vehicle velocity sensor 1, a pulse signal corresponding to the number of revolutions of the tire Wi (hereinafter referred to as a wheel velocity pulse) is outputted. In CPU 2b, based on the wheel velocity pulse outputted from the wheel velocity sensor 1, an angular velocity of rotation Fi of each tire Wi is computed at each predetermined sampling period $\Delta T$ (sec), e.g., $\Delta T=1$ sec.

Figure 3:
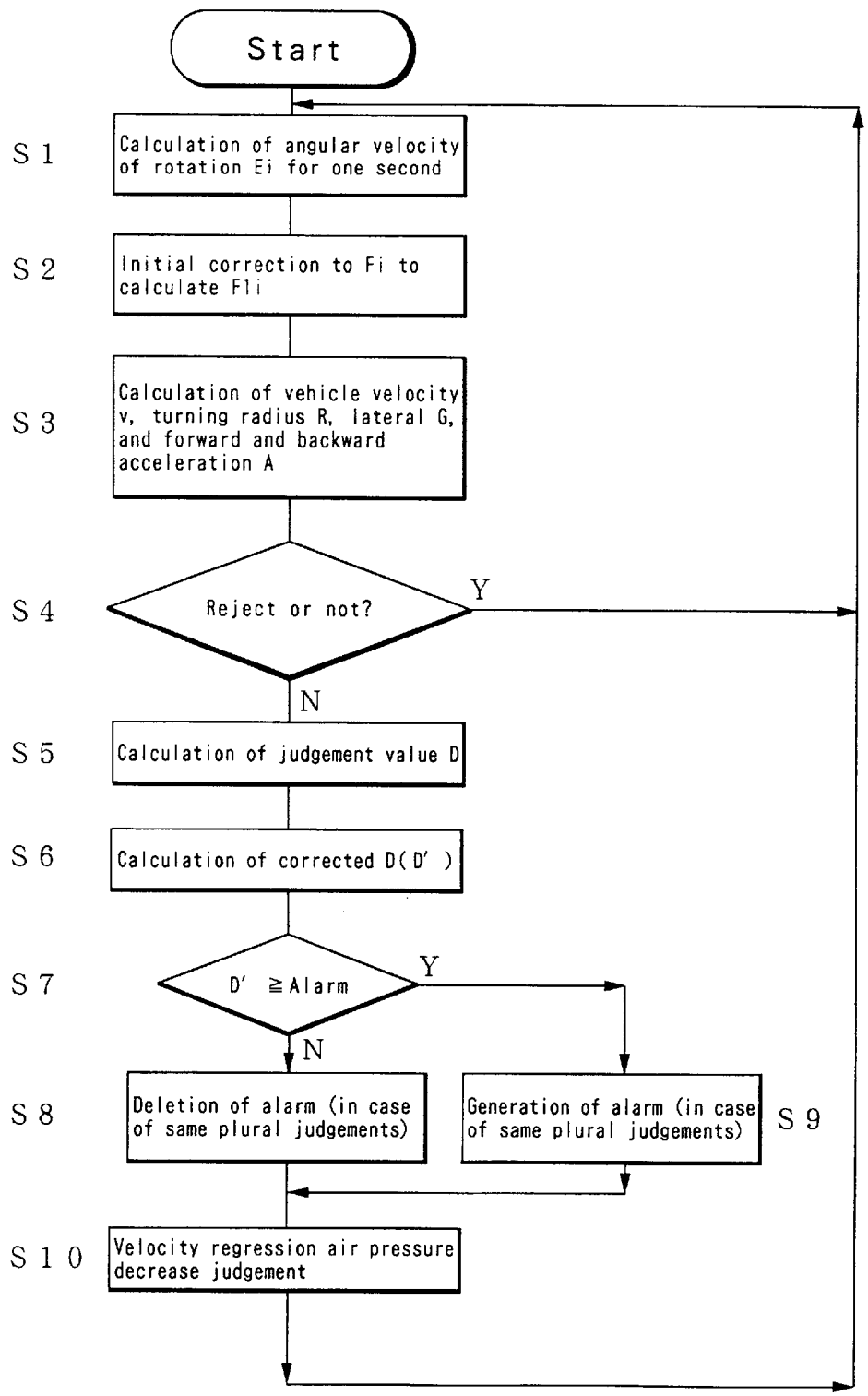
FIG. 3 is a flow chart for illustrating alarm generation/stoppage process in the apparatus for detecting decrease of tire air pressure in FIG. 1.

Next, explanation is given on the alarm generation/stoppage processing in the method of detecting decrease of tire air pressure of the present invention. This process is realized by software. First, as shown in FIG. 3, based on the wheel velocity pulse outputted from the wheel velocity sensor 1 for each one second, the angular velocity of rotation Fi of each tire Wi is computed (Step S1). Here, since the tire Wi is manufactured with including dispersion within the standard (initial difference), the effective rolling radius of each tire Wi is not necessarily identical to one another even if all the tires Wi fall within the normal inner pressure. For this reason, the angular velocity of rotation Fi of each tire Wi is different relative to each other. Therefore, the corrected angular velocity of rotation F1i for canceling the dispersion caused by initial difference noted above is computed (Step S2). Concretely, correction is made as in the equation shown below.

$F1_1 = F_1$
$F1_2 = mF_2$
$F1_3 = F_3$
$F1_4 = nF_4$

The correction coefficients m and n are obtained by, for example, calculating the angular velocity of rotation Fi on the condition that the vehicle runs linearly, and calculating as m=F1/F2, n=F3/F4 based on the calculated angular velocity of rotation Fi.

Then based on the above F1i, vehicle velocity V, turning radius R, lateral G, and forward and backward acceleration A are computed (Step S3).

with respect to the above angular velocity of rotation Fi, depending on the size of the vehicle turning radius R, vehicle velocity V, vehicle lateral direction acceleration G, and forward and backward acceleration (hereinafter referred to simply as forward and backward acceleration) A, the dispersion becomes large, and as a result there is a likelihood to lead to misjudgement.

When the turning radius R is relatively small, there is a likelihood for the tire Wi to slip sideways, so that there is a high possibility for the dispersion of the computed angular velocity of rotation Fi to become large. When the vehicle velocity V is extremely slow, the detection precision of the vehicle velocity sensor 1 is remarkably lowered, so that there is a high possibility for the dispersion of the computed angular velocity of rotation Fi to become large. In the case where the lateral G of vehicle is relatively large, there is a possibility for the tire Wi to slip sideways, so that there is a high possibility for the dispersion of the computed angular velocity of rotation Fi to become large. Further, in the case where the absolute value of the vehicle forward and backward acceleration A is relatively large, there can be the effects of the slip of tire Wi caused by the abrupt acceleration or abrupt deceleration of vehicle or of the foot brake, so that there is a high possibility for the dispersion of the computed angular velocities of rotation Fi to become large. As reviewed above, when there is a high possibility for the errors to be included in the angular velocity of rotation Fi, it is desirable for the angular velocity of rotation Fi not to be adopted for detecting air pressure decrease but to be rejected.

Accordingly, based on the size of the vehicle turning radius R, vehicle velocity V, vehicle lateral direction acceleration G, and forward and backward acceleration A, identification is made as to whether the angular velocity of rotation F1i obtained in the step S2 is rejected or not (Step S4).

As a result of the identification in the Step S4, when the angular velocity of rotation F1i is not rejected, the judgement value D is computed by the equation (3) based on the angular velocity of rotation F1i (Step S5).

$$(F_1+F_4-F_2-F_3)/\{(F_1+F_2+F_3+F_4)/2\} \tag{3}$$

The computation of the vehicle turning radius R, vehicle velocity V, vehicle lateral direction acceleration G, and forward and backward acceleration A in the above Step S5 is carried out by using the angular velocity of rotation F1i to which the correction of the initial difference is made. On the other hand, the effective rolling radius of the tire Wi fluctuates by not only the initial difference but also the vehicle turning radius R, vehicle velocity V, vehicle lateral direction acceleration G, and forward and backward acceleration A. Accordingly, the judgement value D obtained in the step S5 is adjusted according to the effects of the fluctuation factors including the vehicle turning radius R, vehicle velocity V, vehicle lateral direction acceleration G, and forward and backward acceleration A.

In view of the above, there is carried out a correction for rejecting the effects of the fluctuation factors of the judgement value D such as vehicle turning radius R, vehicle velocity V, vehicle lateral direction acceleration G, and forward and backward acceleration A (Step S6).

Concretely, correction is made by the following equation (4).

$$D'=D-\alpha1\times\text{lateral } G-\alpha2\times\text{lateral } G\times A \tag{4}$$

D' obtained in the Step S6 is temporarily stored in, for example, RAM 2d.

Here, in the above equation (4), α1 and α2 are coefficients. These coefficients α1 and α2 are those previously obtainable by such procedures that the vehicle running test is carried out when it is known that each tire Wi is normal, and based on the vehicle turning radius R. vehicle velocity V, vehicle lateral direction acceleration G, and forward and backward acceleration A calculated at that time. The coefficients α1 and α2 are previously stored in, for example, the ROM 2c of the control unit 2.

Using the judgement value D' after correction obtained in the step S6, judgement is made whether the air pressure is lowered or not by the following equation (5) (Step S7). In the equation (5), for example, $D_{TH1}=D_{TH2}=0.1$.

$$D'<-D_{TH1} \text{ or } D'>D_{TH2}$$

As a result, if the judgement value D' satisfies the equation (5), then it is judged that the air pressure has decreased, and if the same judgments are made for plural times continuously to some extent, then an alarm signal is issued (Step S9). On the contrary, if the judgement value D' does not satisfy the equation (5), then it is judged that the air pressure has not decreased, and if the same judgments are made for plural times continuously to some extent, then the alarm is not issued/deactivated (Step S8). Because issuance or inhibition of alarm is not carried our every time when judgment is made whether the air pressure is lowered or the state is in normal inner pressure, and since it is carried out when the same judgements are given continuously to some extent for plural periods, issuance/non-issuance of alarm under effect of abrupt factor such as noise can be prevented.

Figure 5:
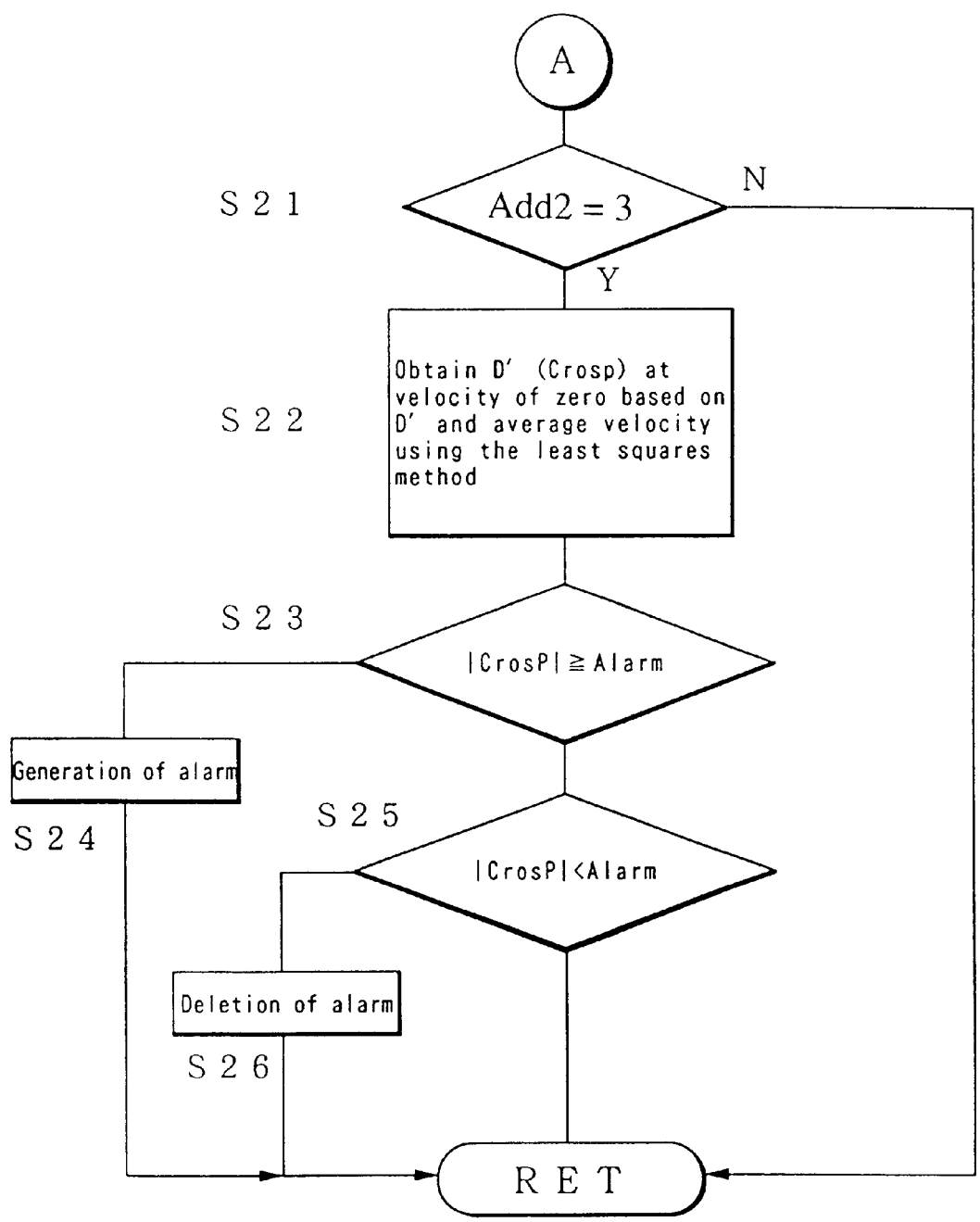

In the case where the air pressure of any tire Wi of the tires Wi is decreased, if the vehicle is running at a relatively low velocity, the angular velocity of rotation Fi of the tire Wi becomes faster than the angular velocity of rotation Fi of the normal inner pressure tire Wi, so that the judgement value D' satisfies the equation (5) in the Step S7. On the contrary, in the case where the vehicle is running at a relatively high velocity, there are cases to show scarce difference between the angular velocity of rotation Fi of the tire Wi whose air pressure has decreased and the angular velocity of rotation Fi of the tire Wi whose inner pressure is normal. In such a case, there is a high possibility for the judgement value D' to become zero, so that the air pressure of the tire Wi is judged to be all normal in the above Step 7. Accordingly, in the present embodiment, in consideration of the fact that, even when the vehicle is operated at a high velocity, if it is being driven, according to the increase in velocity from a certain level, the judgement value D' decreases when evaluating D' from a secondary function manner (refer to FIG. 5 which shows the secondary function analysis or the least squares method), while the judgement value D' at a low velocity by the secondary function is obtained. Then, even if the vehicle is running at a relatively high velocity, only in the case of the vehicle being driven, a preparation process for generation of alarm again (hereinafter referred to as velocity regression pressure decrease judgement method) is carried out (Step S10).

Figure 4:
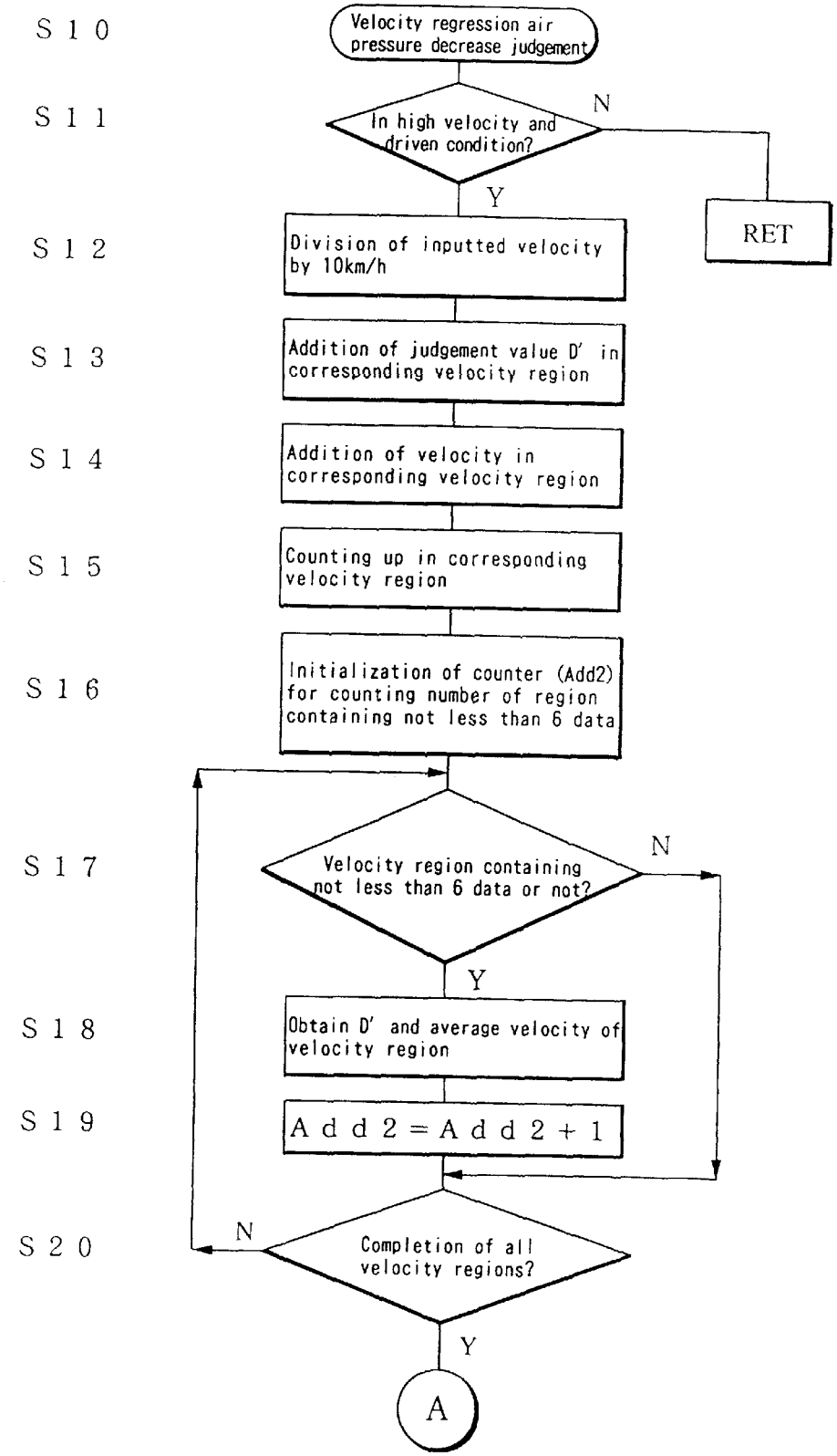
FIGS. 4 and 5 are flow charts for illustrating the velocity regression pressure decrease judgement of the alarm generation/stoppage process in the apparatus for detecting decrease of tire air pressure in FIG. 1.

Next, the details of the above are explained with reference to the flow chart of FIG. 4.

First, in order to carry out a velocity regression pressure decrease judgement method only in the case where the vehicle is running at a relatively high velocity and in a driven condition, identification is made as to whether the vehicle velocity V is higher than the predetermined threshold value $V_{TH}$ (for example, $V_{TH}$=120 km/h) and as to whether the forward or backward acceleration A for identifying whether the vehicle is in driven state or not is higher than the predetermined threshold value $A_{TH}$ (for example, $A_{TH}$=0 G) (Step S11).

If, as a result, the vehicle velocity V is less than the predetermined threshold value $V_{TH}$ and the forward and backward acceleration A is less than the threshold value $A_{TH}$, no inconvenience or misjudgement due to high velocity as described above should occur, so that it is unnecessary to carry out the velocity regression pressure decrease judgement method as described hereinafter. Also, in the case of judgement that the vehicle velocity V is less than the threshold value $V_{TH}$ or the forward and backward acceleration A is less than the threshold value $A_{TH}$, no velocity regression pressure decrease judgement method is applied. In such cases, without undergoing the steps S12–S25, the sequence returns to the step S1. On the other hand, in case that the vehicle velocity V is judged to be higher than threshold value $V_{TH}$ and the forward and backward acceleration A to be higher than the threshold value $A_{TH}$, the velocity regression pressure decrease judgement method in the steps S12–S26 as described is applied below.

In the velocity regression pressure decrease judgement method, the process begins with the practice of classifying the velocity V at present by regions (Step S12). To explain the step S12 concretely, assuming for example to classify the velocity into the regions of 1 to 14 by 10 km/h from 120 km/h, if the velocity V at present is for example 135 km/h, since the velocity in the range of 120 km/h is in the region of 1, the data of 135 km/h comes under the 130 km/h range, so that it is included in the region of 2. The number of divisional regions is determined by the allowable velocity of vehicle.

When the above processing is over, the current judgement value D' and velocity V are added to the velocity range allocated by the step S12 (Steps S13, S14). To explain concretely the steps S13 and S14, as will be understood from the flow chart of FIG. 3, the velocity regression pressure decrease judgement processing is carried out at every second, and when the vehicle is judged to be running at a high velocity and in driven state from the velocity V and the forward and backward acceleration A at present, the steps S12–S26 as shown in FIG. 4 are to be practiced. Accordingly, when the vehicle is judged to be running at a high velocity and in a driven state, the processing is carried out such as to put the velocity V and the judgement value D' at every second into the corresponding region, and to add the value to the value added up so far.

Next, a counting step determines the number of the data in the currently corresponding velocity region (Step 15). To summarize the steps S11–S15 here, the velocity V and the judgement value D' at every second, which are usable for the velocity regression pressure decrease judgement processing for the vehicle which is running at a high velocity and in driven state, are added up to the divided region, and the number of the data in the region is counted.

Next, examination is made as to whether there is any velocity region including not less than six data values or not, with respect to all regions (Step 17). If there is, each average of the judgement value D' and the velocity V added so far in said region is obtained (Step S18) to count up how many regions containing not less than 6 data values have been formed (Step S19). If there is no region, no special operation is made.

If, on completion of these work steps, there are three velocity regions containing not less than 6 data values, then there is obtained a judgement value D' at the time of the velocity=0 km/h (CrosP) based on the averaged velocity V and the judgement value D' in the respective region, by the least squares method (Step S21–S22).

Figure 7:
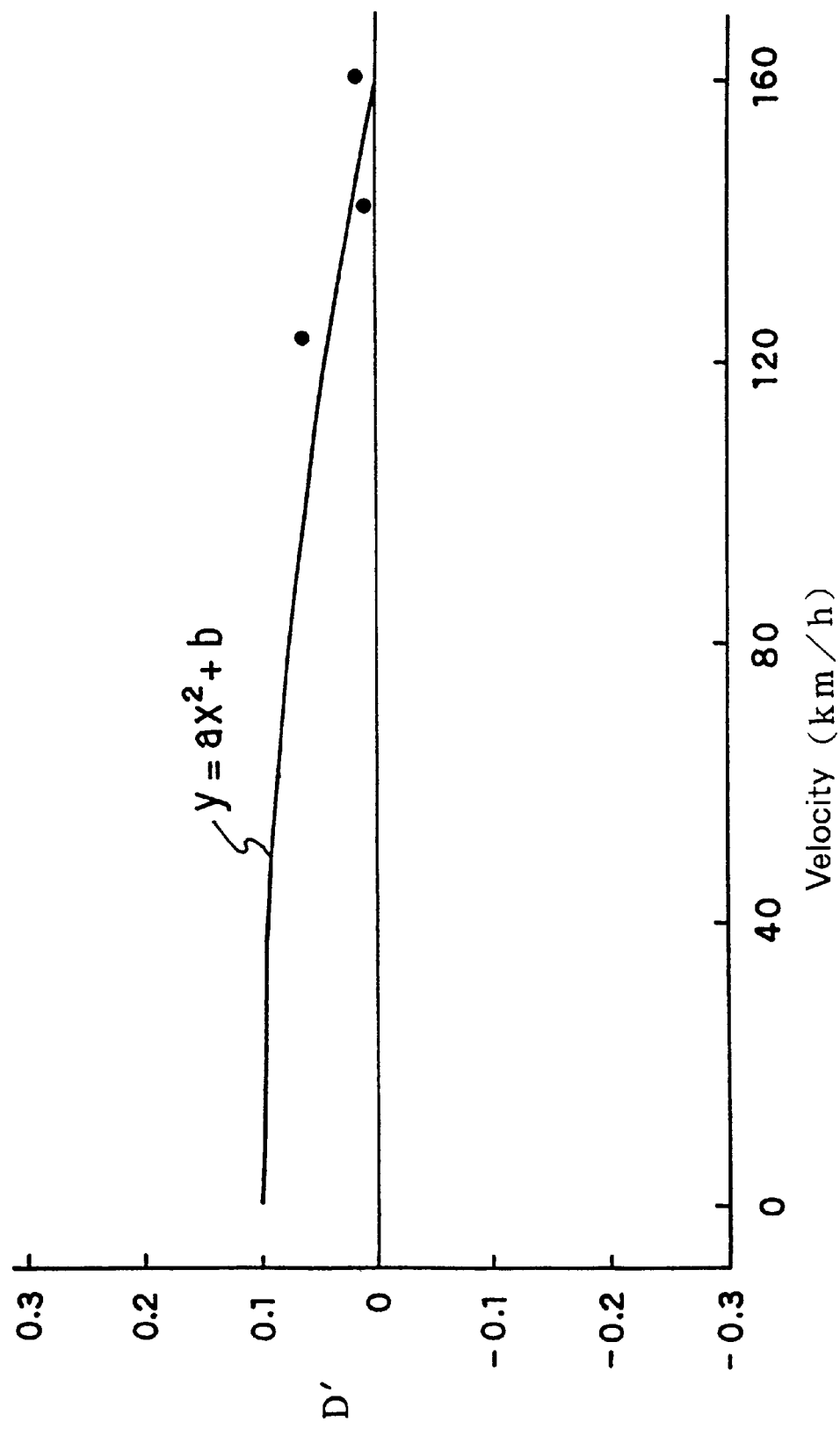
FIG. 7 is a view for illustrating the least squares method.

To explain concretely the least squares method, when a velocity V is taken on an abscissa and a judgement value D' is taken on an ordinate, the averaged velocity V and the judgement value D' corresponding thereto are to be plotted at three points (refer to FIG. 7). Next, assuming a secondary curve $y = a X^2 + b$ passing through the center of these three points, a method of obtaining a and b so that the total of the squares of the lengths of the lines taken from each point on the secondary curve so as to be parallel with the axis y becomes the minimum, is the least squares method used here. The value b herein corresponds to the above CrosP.

If there are not three velocity regions having not less than 6 data values, no special operation is made.

Using the judgement value D' obtained in the step S22 (CrosP) by the equation (5), judgement is made as to whether the air pressure is decreased or not (Step S23–S26). In the next equation (6), for example, $D_{HTH1} = D_{HTH2} = 0.1$.

$$|CrosP| < -D_{HTH1} \text{ or } |CrosP| < -D_{HTH2} \qquad (6)$$

As a result, if the judgement value CrosP satisfies the equation (6), then it is judged that the air pressure has decreased, and alarm is issued (Step 24). On the other hand, if the judgement value Cros P does not satisfy the equation (6), then it is judged that the air pressure has not decreased, and alarm is canceled(Step 26). When various conditions are met and a judgement of alarm is given, the variables in all velocity regions are cleared.

Figure 8:
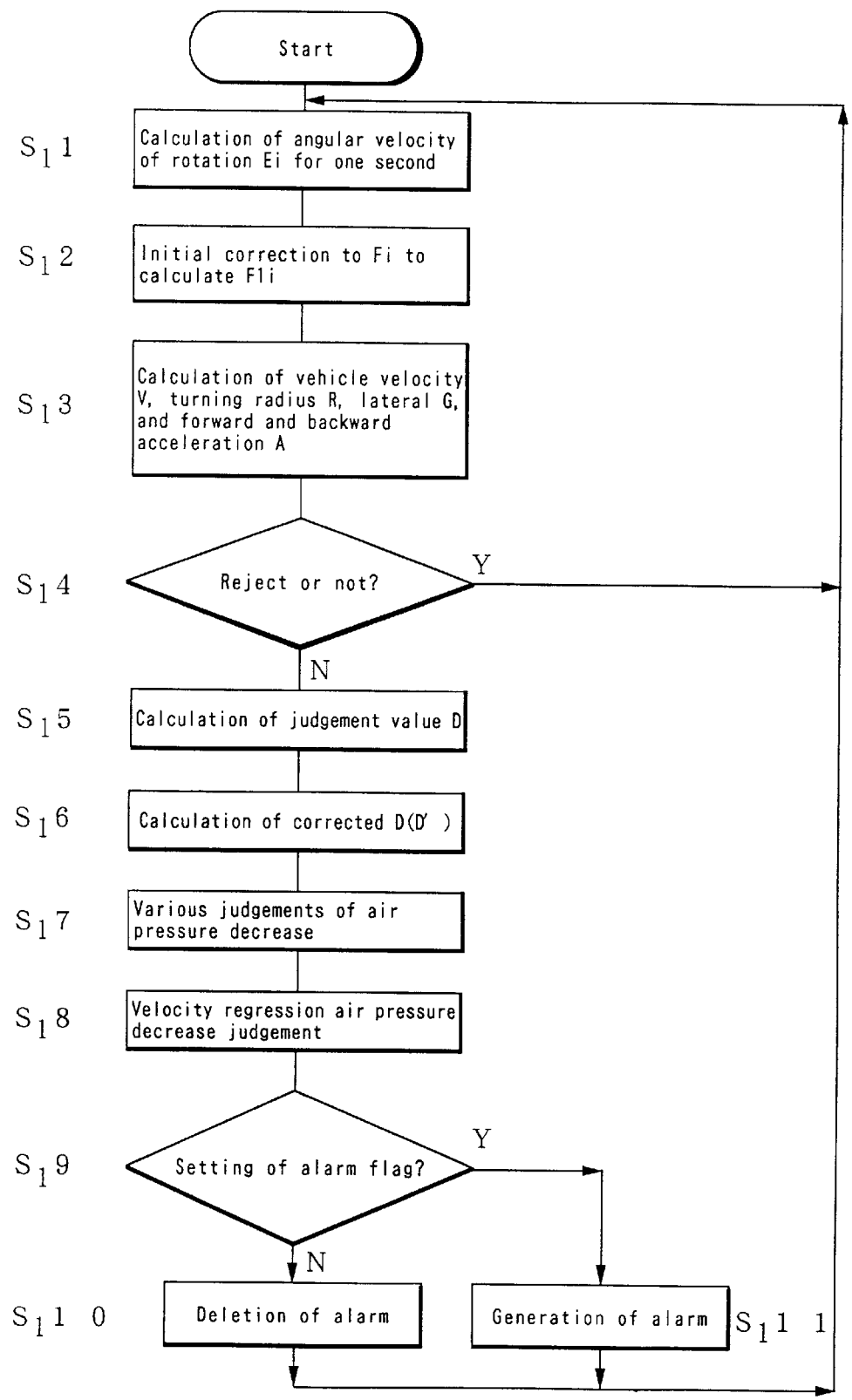
FIG. 8 is a flow chart for illustrating another embodiment of the apparatus for detecting decrease of tire air pressure according to the present invention.

Next, another embodiment of the present invention is described. As shown in FIG. 8, the steps $S_11$–$S_16$ are the same as the steps S1–S6, in which, after termination of the step $S_15$, the program advances to the step $S_16$, and then, using the judgement value D' obtained in the step $S_16$, various judgements on pressure decrease are made (Step $S_17$). In the judgement on pressure decrease, judgement is made as to whether the air pressure has decreased or not by the equation (7), wherein, for example, $D_{TH1} = D_{TH2} = 0.1$.

$$D' < -D_{TH1} \text{ or } D' > D_{TH2} \qquad (7)$$

As a result, if the judgement value D' satisfies the equation (7), the alarm flag is set, while if not, the alarm flag is cleared.

Next, the velocity regression pressure decrease judgement is carried out (Step $S_18$), which will be described in detail below. As a result, if the judgement value satisfies the alarm judgement conditions, an alarm flag is set, while if not, the alarm flag is cleared. Further, such processing is made that, if the alarm flag is set, then the alarm lamp is put on, and if not, the alarm lamp is put off (Steps $S_19$–$S_111$).

Figure 6:
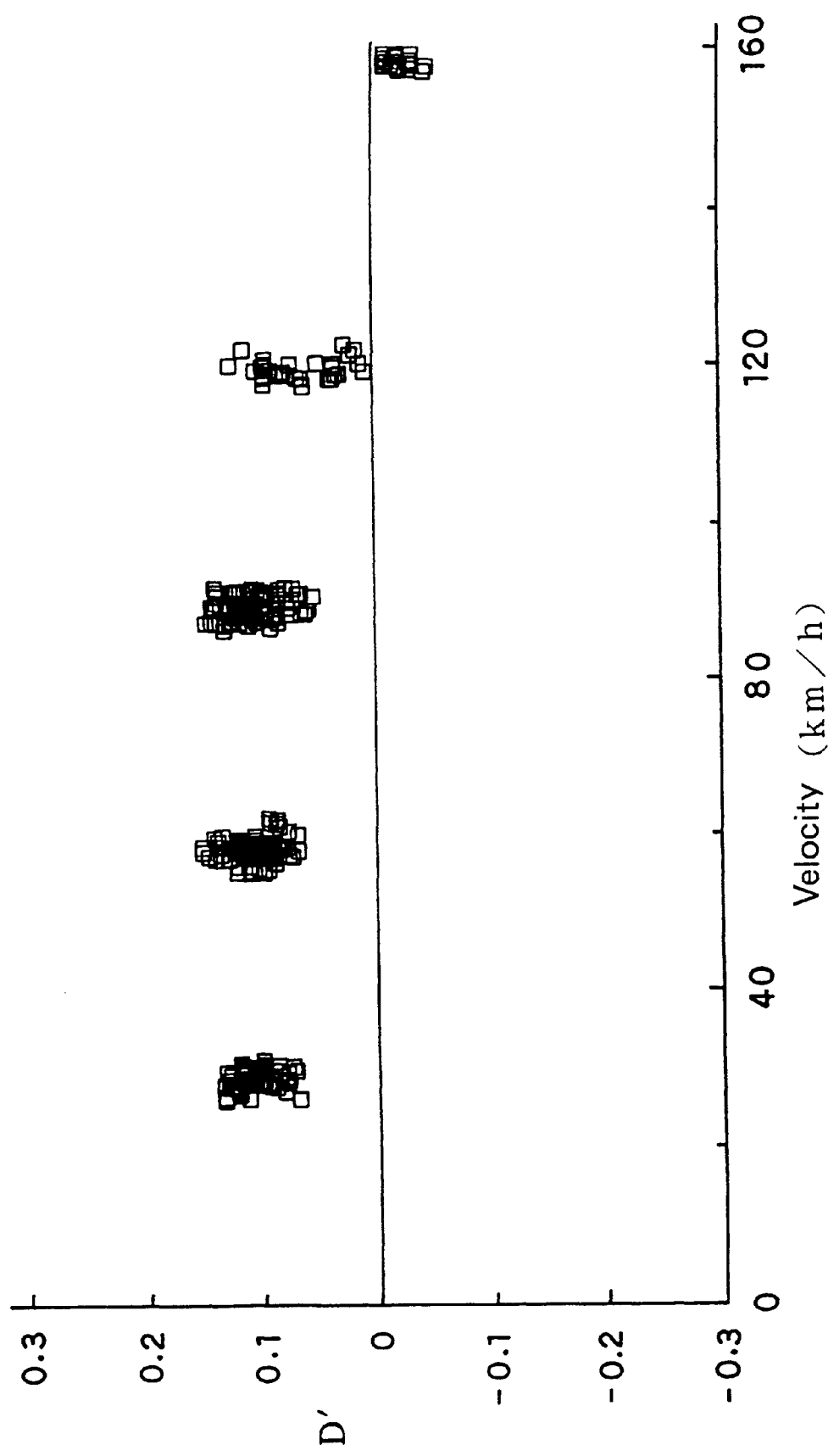
FIG. 6 is an illustrative view to show that, during a high velocity running of the vehicle, the front and rear accelerations are in positive range, and the judgement value decreases in secondary function manner according to increase of velocity.

In the same manner as in the foregoing embodiment, in the case where the air pressure of any tire Wi of the tires Wi is decreased, when the vehicle is running at a relatively low velocity, the angular velocity of rotation Fi of the tire Wi becomes faster than the angular velocity of rotation Fi of the normal inner pressure tire Wi, so that the judgement value D' satisfies the alarm judgement conditions in the above Step $S_17$. Against this, in the case where the vehicle is running at a relatively high velocity, there are cases to show scarce difference between the angular velocity of rotation Fi of the tire Wi whose air pressure has decreased and the angular velocity of rotation Fi of the tire Wi whose inner pressure is normal. In such case, there is a high possibility for the judgement value D' to become zero, and the air pressure of the tire Wi is judged to be all normal in the Step $S_17$. However, it is known that, even when the vehicle is operated at a high velocity, if it is being driven, according to the increase in velocity from a certain level, the judgement value D' decreases in a secondary function manner (refer to FIG. 6).

Accordingly, in the present embodiment, it is designed to obtain the judgement value D' at a low velocity by the secondary function, and even when the vehicle is running at a relatively high velocity, only in the case of the vehicle being driven, a preparation process for generation of alarm is carried out again.

Figure 9:
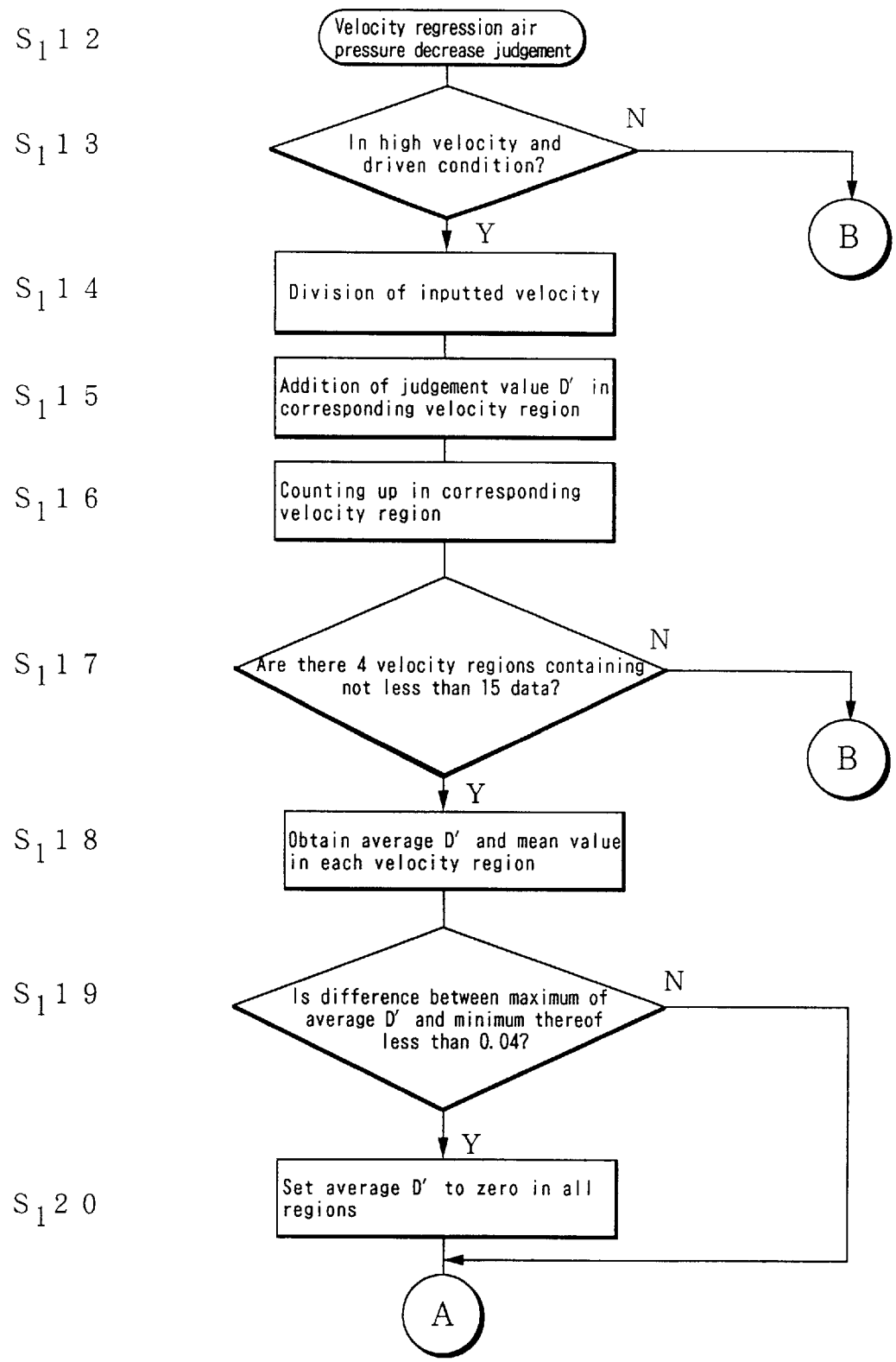
FIGS. 9 and 10 are flow charts for illustrating the velocity regression pressure decrease judgement in FIG. 8.
Figure 10:
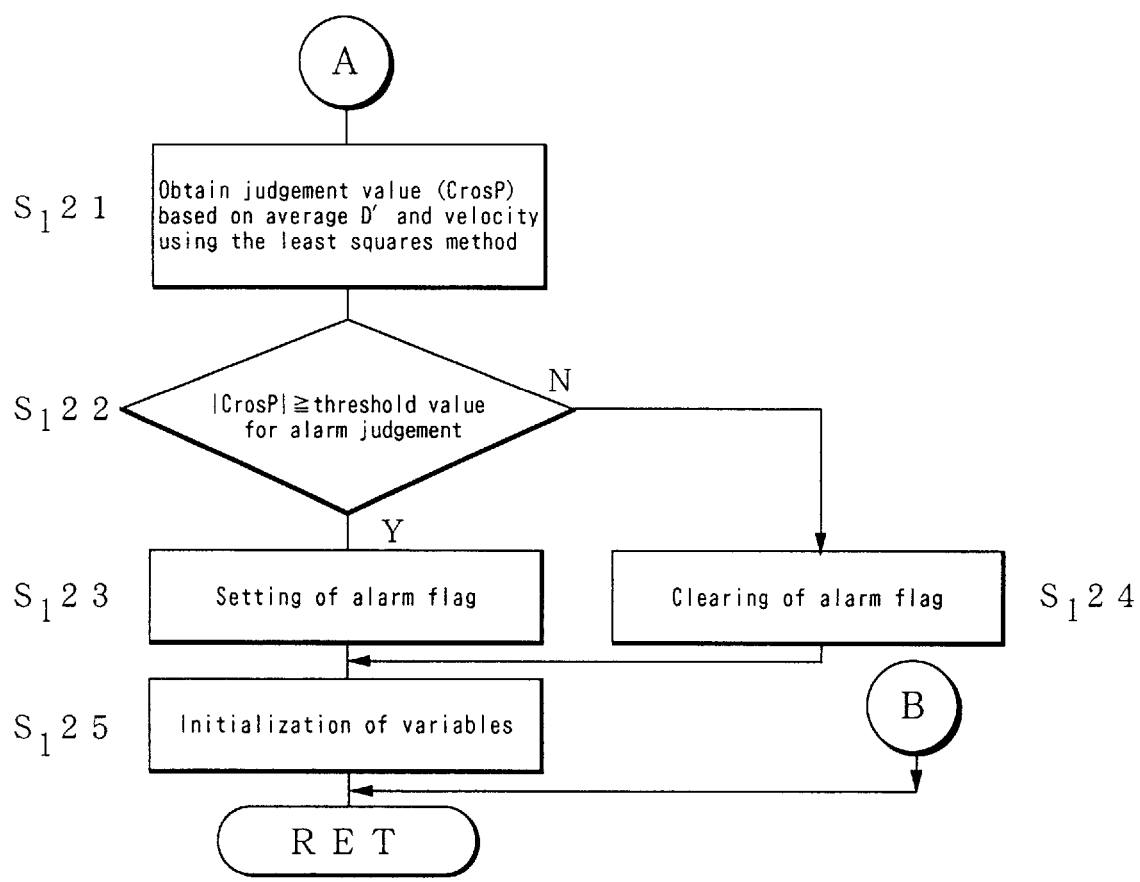

Next, the details of the above are explained with reference to the flow chart of FIGS. 9 and 10.

First, in order to carry out a velocity regressive pressure decrease judgement method only in the case where the vehicle is running at a relatively high velocity and in driving condition, identification is made as to whether the vehicle velocity V is higher than the predetermined threshold value $V_{TH}$ (for example, $V_{TH}$=85 km/h) or as to whether the forward and backward acceleration A for identifying whether the vehicle is in driven state or not is higher than the predetermined threshold value $A_{TH}$ (for example, $A_{TH}$=0 G or −0.03 G) (Step $S_113$).

If, as a result, it is judged that the vehicle velocity V is less than the predetermined threshold value $V_{TH}$ or the forward and backward acceleration A is less than the threshold value $A_{TH}$, no phenomenon as described above should occur, so that the velocity regression pressure decrease judgement method as described hereinafter is not applied. In such case, without undergoing the steps $S_114$–$S_125$, the sequence returns to the step $S_19$. On the other hand, in the case where the vehicle velocity V is judged to be higher than the threshold value $V_{TH}$ and the forward and backward acceleration A to be higher than the threshold value $A_{TH}$, the velocity regression pressure decrease judgement method in the steps $S_114$–$S_125$ as described later is applied.

In the velocity regression pressure decrease judgement method, the process begins with the practice of classifying the velocity V at present by regions (Step $S_114$). To explain the step $S_114$ concretely, assuming for example to classify the velocity into the regions of 1 to 14 by 5 km/h from 85 km/h to 155 km/h, if the velocity V at present is for example 100 km/h, since the velocity in the range of 85 km/h is in the region of 1, the data of 100 km/h comes under the 100 km/h range, so that it is to be included in the region of 4. The number of divisional regions is determined by the allowable velocity of vehicle.

When the above processing is over, the current judgement value D' and velocity V are added to the velocity region allocated by the step $S_114$ (Step $S_115$). To explain concretely the step $S_115$, as will be understood from the flow chart of FIG. 8, the velocity regression pressure decrease judgement processing is carried out every second, and when the vehicle is judged to be running at a high velocity and in a driven state from the velocity V and the forward and backward acceleration A at present, the steps $S_114$–$S_125$ as shown in FIGS. 9 and 10 are to be practiced. Accordingly, when the vehicle is judged to be running at a high velocity and in driven state, the processing is carried out such as to put the velocity V and the judgement value D' at every second into the corresponding region, and to add the value to the value added up so far.

Next, a counting step determines the number of the data in the currently corresponding velocity region (Step $S_116$).

To summarize the steps $S_114$–$S_116$ here, the velocity V and the judgement value D' at every second, which are usable for the velocity regression pressure decrease judgement processing for the vehicle running at a high velocity and in driven state, are added up to the divided region, and the number of the counters in the corresponding region is increased by one.

Next, examination is made as to whether there are in all regions the predetermined number (e.g., four regions) of velocity regions having not less than the predetermined number (e.g., 15) of data values or not (Step $S_117$). If there is, an average of the judgement value D' added so far in the region and mean value of each velocity region are obtained (Step $S_118$).

Further, when the difference between the maximum value and the minimum value of the average D' is less than the predetermined threshold value, e.g., 0.04, then the average D' in all regions is set to be zero (step $S_119$–$S_120$). In this case, the alarm judgement value to be ultimately obtained should be made zero, so that no alarm is detected.

Figure 11:
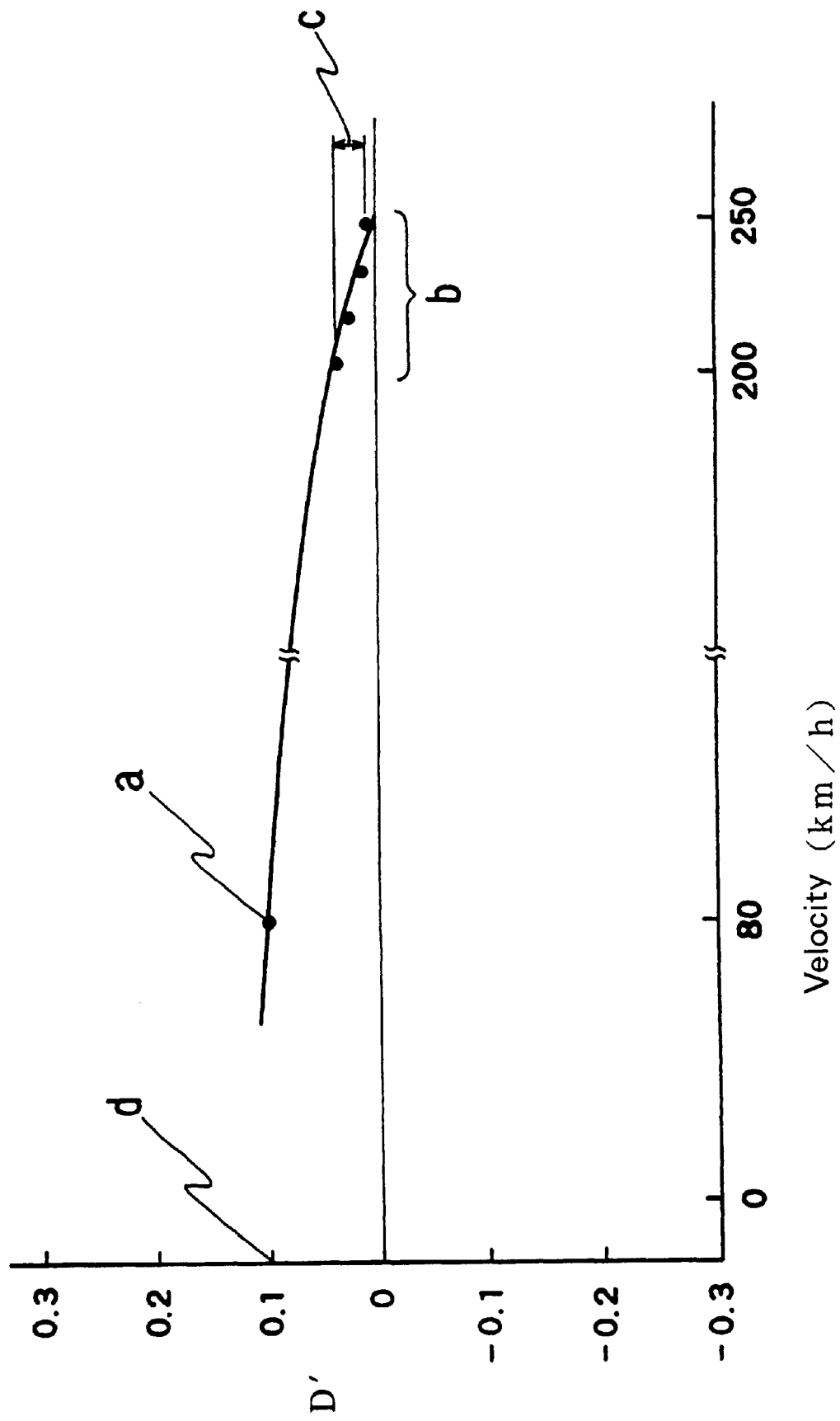
FIG. 11 is an illustrative view of erroneous judgement.

In the present invention, the steps $S_119$–$S_120$ are not limited by the processes disclosed therein. For example, when operation is made from the region to be used for the least squares method or from the relation of the average D' in the steps $S_119$–$S_120$, there is an apprehension to produce erroneous judgement. For example, with respect to the judgement value a obtained by regression, even if, as shown in FIG. 11, the regression data are gathered in the four velocity ranges which are considerably separated from the medium and low velocities and the judgement value of the data show decrease against the increase in velocities, in the case where the difference c between the maximum value and the minimum value is of a dispersion degree within a normal inner pressure of, for example, not more than 0.03, there is a possibility for erroneous judgement to be led out if a regression curve is obtained on the basis of such value. The value d in FIG. 11 is an alarm judgement threshold value.

Also, in the steps $S_119$–$S_120$, when the high velocity regions (e.g., higher than 150 km/h) and the regions to be used for the least squares method are near (e.g., the four regions are all adjacent), the average D' can be set to zero.

Alternatively, in the steps $S_119$–$S_120$, by the region of the lower limit velocity of the average D' (e.g., at the time of 150 km/h), the threshold value of the alarm judgement can be changed (e.g., to provide a variant for duplication).

Furthermore, in the steps $S_119$–$S_120$, by the region of the lower limit velocity of the average D' (e.g., at the time of 150 km/h), the average D' of the lower limit velocity might be weighted (e.g., to make two part equivalents).

If, on completion of these work steps, there are four regions containing not less than 15 data values, then the judgement value D' at a low velocity (CrosP) is obtained by the least squares method, based on the intermediate velocity V averaged in the respective regions and the average D' (Step $S_121$).

To explain concretely the least square method, when a velocity V is taken on abscissa and an identification value D' is taken on ordinate, the intermediate velocity V in each region obtained from the above and the judgement value D' corresponding thereto are to be plotted at four points (refer to FIG. 12). Next, assuming a secondary curve y=a $X^2$+b passing through the center of these four points, a method of obtaining a and b in such a manner that the total of the squares of the lengths of the lines taken from each point on the secondary curve so as to be parallel with the axis y becomes the minimum, is the least square method used here. The value b herein corresponds to the above CrosP.

If there is not four velocity regions having not less than 15 data, no special operation is made.

Using the judgement value D' (CrosP) obtained in the step $S_121$, judgement is made as to whether the air pressure is decreased or not (Step $S_122$–$S_125$) by the equation (8). In the next equation (8), for example, $D_{HTH1}=D_{HTH2}=0.1$.

$$CrosP<-D_{HTH1} \text{ or } CrosP<-D_{HTH2} \tag{8}$$

As a result, if the judgement value CrosP satisfies the equation (8), then it is judged that the air pressure has decreased, and an alarm flag is set (Step $S_123$). On the other hand, if the judgement value CrosP does not satisfy the equation (8), then it is judged that the air pressure has not decreased, and the alarm flag is cleared (Step $S_124$). When various conditions are met and a judgement of alarm is given, the variables in all velocity regions are cleared (Step $S_125$).

As described above, according to the present invention, there are provided a plurality of judging means suited respectively to the vehicle running conditions. Accordingly, the judgement according to the vehicle running condition can be realized in any judging means. Consequently, it is possible to detect accurately whether or not tire air pressure decreases regardless of the vehicle running condition, and as a result it is possible to prevent erroneous issuance or non-issuance of alarm. Since this invention thus serves to improve the driver's reliability on the alarm, improvement of traffic safety can be expected.

Furthermore, in addition to the judging means for low velocity to carry our judgement on detection of the angular velocity of rotation, there is provided judging means for high velocity such as to carry out judgement if the conditions such that, after the detection of the angular velocity of rotation, the vehicle velocity is not less than the threshold value and yet the vehicle is in driven state are satisfied. Therefore, regardless of the running velocity level of the vehicle, accurate detection can be made as to whether the air pressure of the tire has decreased or not. Accordingly, erroneous issuance or non-issuance of alarm can be prevented. Consequently, since it is possible to improve the driver's reliability to the alarm, improvement of traffic safety can be expected.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What I claim is:

1. A method for detecting decrease of tire air pressure comprising the steps of:

moving a vehicle having four wheels at a velocity;

detecting the velocity of the vehicle;

calculating angular velocity for each wheel simultaneously;

calculating a first pressure judgement value based on angular velocity of all the wheels;

activating an alarm when the first pressure judgement value is greater than a predetermined pressure judgement value;

calculating a second pressure judgement value based on an average vehicle velocity when the velocity and an acceleration of the vehicle are greater than a predetermined vehicle velocity value and a predetermined vehicle acceleration value; and activating the alarm when the second pressure judgement value is greater than the predetermined pressure judgement value.

2. The method of claim 1, wherein said calculating the second judgement value step further includes the steps of:

storing a plurality vehicle velocity values;

dividing the vehicle velocity values into a plurality of regions at predetermined intervals;

calculating an average velocity value for each region when each region includes a predetermined number of vehicle velocity values;

calculating the second judgement value from a secondary function derived from a least squares method which employs a predetermined number of average velocity values; and activating the alarm when the second pressure judgement value is greater than the predetermined pressure judgement value.

3. The method of claim 1, further comprising the step of correcting the first judgement value according to at least one of a turning radius of the vehicle, the vehicle velocity, a lateral acceleration of the vehicle, and at least one of forward and backward acceleration of the vehicle.

4. A method for detecting decrease of tire air pressure comprising the steps of:

moving a vehicle having four wheels at a velocity;

calculating angular velocity for each wheel simultaneously;

correcting angular velocity of at least one wheel to compensate for uneven rolling radii of respective tires due to manufacturing tolerances;

calculating a first pressure judgment value based on angular velocity of all the wheels;

activating an alarm when the first pressure judgment value is greater than a predetermined pressure judgment value;

detecting the velocity of the vehicle;

calculating a second pressure judgment value based on an average vehicle velocity when the velocity and the acceleration of the vehicle are greater than a predetermined vehicle velocity value and a predetermined vehicle acceleration value, wherein the calculation of the second pressure judgment value further includes the substeps of:

storing a plurality vehicle velocity values;

dividing the vehicle velocity values into a plurality of regions at predetermined intervals;

calculating an average velocity value for each region when each region includes a predetermined number of vehicle velocity values;

calculating the second judgment value from a secondary function derived from at least squares method which employs a predetermined number of average velocity values; and activating the alarm when the second pressure judgment value is greater than the predetermined pressure judgment value.

5. The method of claim 4, further comprising the step of correcting the first pressure judgment value according to at least one of a turning radius of the vehicle, the vehicle velocity, a lateral acceleration of the vehicle, and forward and backward acceleration of the vehicle.

6. An apparatus for detecting decrease of tire air pressure of a vehicle comprising:

means for calculating angular velocity for each wheel simultaneously;

means for detecting the velocity of the vehicle;

means for calculating a first pressure judgement value based on angular velocity of all the wheels;

means for activating an alarm when the first pressure judgement value is greater than a first predetermined pressure judgement value;

means for calculating a second pressure judgement value based on an average vehicle velocity when a velocity and an acceleration of the vehicle are greater than a predetermined vehicle velocity value and a predetermined vehicle acceleration value; and means for activating the alarm when the second pressure judgement value is greater than the predetermined pressure judgement value.

7. The apparatus of claim 6, wherein said means for calculating the second judgement value further includes:

means for storing a plurality vehicle velocity values;

means for dividing the vehicle velocity values into a plurality of regions at predetermined intervals;

means for calculating an average velocity value for each region when each region includes a predetermined number of vehicle velocity values; and means for calculating the second judgement value from a secondary function derived from a least squares method which employs a predetermined number of average velocity values; and means for activating an alarm when the pressure judgement value is,greater than a predetermined pressure judgement value.

8. The apparatus of claim 6, further comprising means for correcting the first judgement value according to at least one of a turning radius of the vehicle, the vehicle velocity, a lateral acceleration of the vehicle, forward and backward acceleration of the vehicle.

9. An apparatus for detecting decrease of tire air pressure comprising:

means for calculating angular velocity for each wheel simultaneously;

means for correcting angular velocity of at least one wheel to compensate for uneven rolling radii of respective tires due to manufacturing tolerances;

means for calculating a first pressure judgment value based on angular velocity of all the wheels;

means for activating an alarm when the first pressure judgment value is greater than a predetermined pressure judgment value;

means for detecting the velocity of the vehicle;

means for calculating a second pressure judgment value based on angular velocity of all the wheels when the velocity and the acceleration of the vehicle are greater than a predetermined vehicle velocity value and a predetermined vehicle acceleration value, wherein the means for calculation of the second pressure judgment value further includes:

means for storing a plurality vehicle velocity values;

means for dividing the vehicle velocity values into a plurality of regions at predetermined intervals;

means for calculating an average velocity value for each region when each region includes a predetermined number of vehicle velocity values;

means for calculating the second judgment value from a secondary function derived from a least squares method which employs a predetermined number of average velocity values; and means for activating the alarm when the second pressure judgment value is greater than the predetermined pressure judgment value.

10. The apparatus of claim 9, further comprising means for correcting the first pressure judgment value according to at least one of a turning radius of the vehicle, the vehicle velocity, a lateral acceleration of the vehicle, and at least one of forward and backward acceleration of the vehicle.

* * * * *